May 7, 1968 L. B. BROWDER 3,381,965

TRACK CHANGING MECHANISM FOR MAGNETIC TAPE RECORDERS

Filed Oct. 23, 1965

INVENTOR.
LEWIS B. BROWDER
BY
Christie, Parker & Hale
ATTORNEYS.

United States Patent Office 3,381,965
Patented May 7, 1968

3,381,965
TRACK CHANGING MECHANISM FOR MAGNETIC TAPE RECORDERS

Lewis B. Browder, Arcadia, Calif., assignor, by mesne assignments, to Bell & Howell Company, Chicago, Ill., a corporation of Illinois Filed Oct. 23, 1965, Ser. No. 502,859
8 Claims. (Cl. 274—4)

ABSTRACT OF THE DISCLOSURE

There is described a mutiple track magnetic tape recorder in which a magnetic head is shifted laterally from one track to the next in relation to the magnetic tape. A special mechanism is provided by which the pressure of the magnetic tape against the pole tips of the magnetic head is relieved while the magnetic head is being shifted from one track to the next. The head is limited to movement laterally of the tape. Opposite the head, on the other side of the tape, is a roller having a groove. The roller normally presses the tape against the pole tips of the head, the groove being aligned with the pole tips. During track changing, the roller is backed off from the head and shifted laterally relative to the tape, together with the head, and then brought back into tape engaging position for the next track.

This invention relates to magnetic tape recorders, and more particularly, is concerned with a high-speed multiple track recorder with a mechanical track changing mechanism.

Recording on more than one track on magnetic tape is well known. One application of multiple track recording has been in the video tape field where the high frequencies encountered in video tape recording require a relatively high speed between the magnetic tape and the transducer heads. To simplify the tape storage and transport problem, it is desirable to record on parallel tracks of a short wide tape during successive passes of the tape rather than record continuously on a single long track of a long tape. However, this requires that the recording head be shifted from one track to the next and the tape be reversed at the limit of each excursion of the tape.

Any track changing mechanism in which the magnetic head is shifted laterally from one track to the next in relation to the magnetic tape must be capable of holding the magnetic head securely in position during the recording and playback operation. Moreover, contact must be made at all times between the magnetic tape and the head to develop a sufficiently high signal level on playback. One arrangement for maintaining effective contact has been to pass the tape around a roller having a peripheral groove. The pole-tips forming the magnetic gap of the recording and playback head is shaped to press against the magnetic tape opposite the groove. The distortion of the magnetic tape into the groove by the pressure of the magnetic head insures compliant contact between the magnetic tape and the pole-tips of the head. With such arrangement, an additional requirement is imposed on the track changing mechanism in that the position of the groove in relation to the tape must be shifted at the same time and that the magnetic head is shifted in relation to the tape. Moreover, the spacing between the roller and the magnetic head must be increased to permit the tape to be shifted laterally in the space between the separated roller and the magnetic head.

The present invention is directed to a magnetic tape recorder having an improved track-shifting mechanism which insures good contact between the magnetic head and tape when in the operative position. At the same time, it permits the magnetic head to be readily shifted in relation to the magnetic tape from one track to another. This is accomplished in brief by providing a tape transport mechanism in which the magnetic tape passes over a grooved roller. The roller revolves freely and is supported on a stationary shaft which is carried on a threaded member. The threaded member is supported in a threaded stationary element. Rotation of the threaded member displaces the roller along its axis of rotation so as to shift the roller in relation to the fixed path of the magnetic tape passing over the roller. A magnetic head is mounted on a post adjacent the roller and the post is supported in slides which permit the head to move in a direction parallel to the axis of rotation of the threaded member. The support for the head is coupled to the threaded member so that rotation of the threaded member advances both the roller and the head by the same amount. Thus the head and groove in the roller are always in registration. However, the axis of rotation of the roller is offset from the axis of rotation of the threaded member so that as the threaded member is rotated, the roller is moved away from the head and then brought back into engagement with the head at the completion of one revolution of the threaded member.

For a more complete understanding of the invention, reference should be made to the accompanying drawings wherein.

Figure 1:
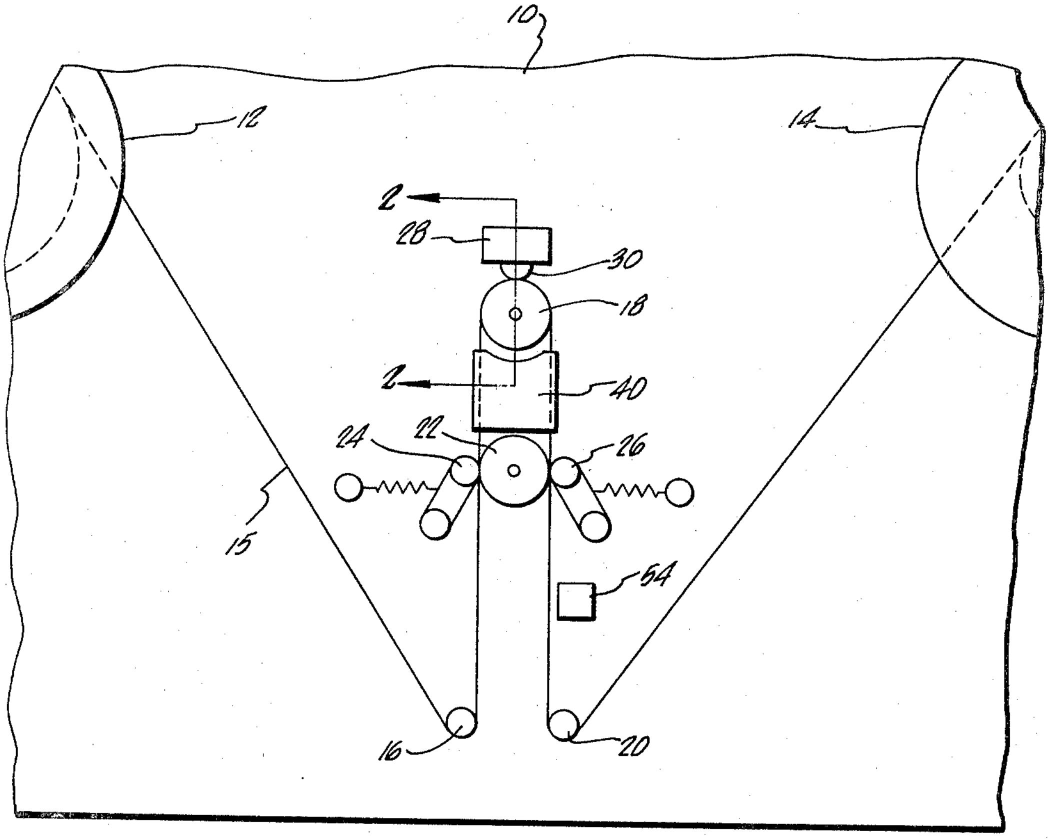
FIG. 1 is a plan view of the tape transport incorporating the features of the present invention.

Referring to the drawings in detail, the numeral 10 indicates generally the base or supporting frame of the tape transport deck. A pair of reels 12 and 14 are rotatably mounted above the deck and are driven by suitable reel motors (not shown) positioned below the reels on the opposite side of the deck in conventional manner.

Magnetic tape passes from the reel 12 around a guide roller 16, around a guide roller 18 to a guide roller 20, and then to the tape reel 14. A capstan 22 is rotated at constant speed by a suitable capstan drive motor (not shown) positioned below the deck 10. Pinch rollers 24 and 26, when engaged, urge the tape into contact with the surface of the capstan 22 at diametrically opposite positions. A magnetic transducer head 28 has pole-tips 30 which are normally in contact with the magnetic tape as it passes around the roller 18.

Figure 2:
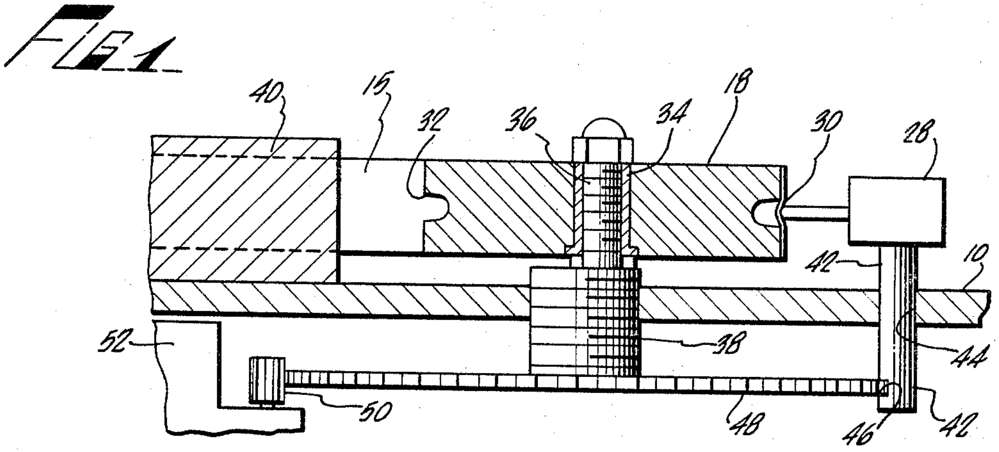
FIG. 2 is a sectional view taken substantially on the line 2—2 of FIG. 1.

The track-changing mechanism is shown in more detail in FIG. 2. The guide roller 18 is provided with a flat peripheral surface in which is formed a single peripheral groove 32. As is apparent in FIG. 2, the pole-tips 30 of the magnetic head 28, in the operative position, project into the groove 32, thereby depressing the surface of the tape slightly as it passes under the pole-tips 30 to provide good contact between the pole-tips and the magnetic tape.

A roller 18 is provided with a bushing 34 or other suitable bearing which is journaled on a shaft 36. The shaft 36 in turn is secured to an externally threaded member 38 which engages a threaded opening in the base plate 10. The axis of the shaft 36 is offset from the axis of the threaded member 38. Thus rotation of the threaded member 38 causes the roller 18 to move along a circular path away from the magnetic head 28 and at the same time rotation of the threaded member 38 produces a vertical movement of the roller 18. This vertical movement produces transverse deflection of the roller 18 relative to the magnetic tape 15 which is guided at a fixed lateral position by a guide member 40 located between the capstan 22 and the roller 18. The guide member 40 is formed with channels on either side for receiving and edge guiding the tape as it passes between the capstan 22 and the roller 18.

In order to maintain registration between the pole-tips 30 of the head 28 in the single groove 32 of the roller 18, the magnetic head 28 is mounted on a supporting post 42 which in turn is slidably supported in an opening 44 in base plate 10. The lower end of the supporting post 42 is provided with a slot 46 which is engaged by a circular disc 48 secured to the lower end of the threaded member 38. Thus as the threaded member 38 rotates, the disc 48, by engaging the slot 46, moves the magnetic head 28 in a vertical direction by a like amount.

Rotation may be imparted to the threaded member 38 as required by any suitable means, such as a pinion 50 which engages teeth on the edge of the disc 48, the pinion being driven by a conventional motor and clutch assembly 52 by which the drive can be initiated and then interrupted at the completion of each revolution of the disc 48.

Figure 3:
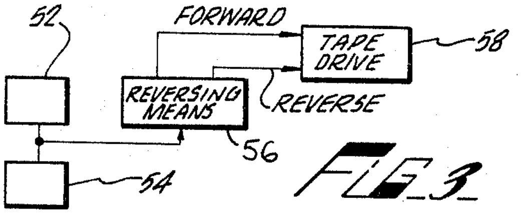
FIG. 3 is a schematic diagram of the control circuit for the tape transport.

In operation, as best shown in FIG. 3, means, such as indicated at 54 senses when the tape has reached the end of its travel in either direction. The tape sensor 54 may be a conventional optical sensing device which notes a change in transparency of the tape, for example, or electrical means for sensing a change in the conductivity of the tape as it approaches the end of its travel. The end-of-tape sensor 54 operates reversing means 56 which actuates the tape drive mechanism 58 including the reel motors and the capstan motor to change the direction of the tape. At the same time, the end-of-tape sensor 54 triggers the motor and clutch assembly 52 to impart one turn to the disc 48. This moves the guide roller 18 away from the magnetic head 28 and back into an operational position in which the tape engages the magnetic head 28. At the same time, it causes the guide roller 18 and magnetic head 28 to be moved transversely of the tape 15. The pitch of the screw thread of the threaded member 38 corresponds to the distance between adjacent recording tracks on the magnetic tape 15. Thus the track changing mechanism causes the magnetic head to scan a succession of tracks on the magnetic tape as the tape is driven back and forth past the magnetic head.

What is claimed is:

1. A tape recorder comprising a frame, means secured to the frame for guiding magnetic tape in a loop, the guiding means holding the edge of the tape in the loop in a fixed plane of movement, a magnetic head having pole tips positioned to contact the tape at the outside of the loop, means supporting and guiding the head for movement transverse to the plane of movement of the tape loop, whereby the head can be positioned opposite any one of a plurality of parallel tracks on the tape, the tape guide means including a drum rotatable about its center and positioned inside of the tape loop and normally in contact with the tape, the drum having a groove around the tape contacting surface of the drum, means for adjustably supporting the drum from the frame including a member threadedly engaging a portion of the frame along an axis parallel to the axis of rotation of the drum, and a shaft on which the drum is journaled for rotation about said axis of rotation, the shaft being secured to the threaded member with the axis of the shaft being parallel to the axis of the threaded member and offset therefrom, whereby rotation of the threaded member shifts the axis of the shaft in a circular path and thereby moves the axis of rotation of the drum toward and away from the head, the pole tips of the head pressing the tape into the groove when the head is in its closest position to the drum, and means linking the head supporting means and threaded member such that the head remains aligned with the groove with rotation of the threaded member.

2. Apparatus as defined in claim 1 wherein said last named means includes a disc secured to the threaded member, the disc engaging a slot in the head supporting means.

3. Apparatus as defined in claim 1 further including means for indexing the threaded member through one revolution at a time to shift the head and drum relative to the tape.

4. A tape recorder comprising a frame, means secured to the frame for guiding magnetic tape in a loop, the guiding means holding the edge of the tape in the loop in a fixed plane of movement, a magnetic head having pole tips positioned to contact the tape at the outside of the loop, means supporting and guiding the head for movement transverse to the plane of movement of the tape loop, whereby the head can be positioned opposite any one of a plurality of parallel tracks on the tape, the tape guide means including a drum rotatable about its center and positioned inside of the tape loop and normally in contact with the tape, the drum having a groove around the tape contacting surface of the drum, means for adjustably supporting the drum from the frame including a member threadedly engaging a portion of the frame along an axis parallel to the axis of rotation of the drum, and a shaft on which the drum is journaled for rotation about its axis of revolution, the shaft being secured to the threaded member with the axis of the shaft being parallel to and offset from the axis of the threaded member, the pole tips of the head pressing the tape into the groove when the head and drum are in operative position, and means linking the head supporting means and threaded member such that the head remains aligned with the groove with rotation of the threaded member.

5. A tape recorder comprising a frame, means secured to the frame for guiding magnetic tape in a loop, the guiding means holding the edge of the tape in the loop in a fixed plane of movement, a magnetic head having pole tips positioned to contact the tape at the outside of the loop, means supporting and guiding the head for movement transverse to the plane of movement of the tape loop, whereby the head can be positioned opposite any one of a plurality of parallel tracks on the tape, the tape guide means including a drum rotatable about its center and positioned inside of the tape loop and normally in contact with the tape, the drum having a groove around the tape contacting surface of the drum, means for adjustably supporting the drum from the frame, said drum supporting means including means for simultaneously moving the drum in a direction away from or toward the head and in a direction parallel to the axis of rotation of the drum, the drum being journaled for rotation about its axis of rotation on said drum supporting means, and means linking the head supporting means and the drum supporting means such that the head and drum move simultaneously and the groove of the drum remains aligned with the pole tips of the head.

6. A tape recorder comprising a rotatable cylindrical drum having a single groove around the periphery of the drum, means for guiding magnetic tape in a loop around a portion of the periphery of the drum, the guiding means holding the edge of the tape in a fixed plane of movement, means for rotatably supporting the drum including a threaded member and a shaft journaled through the center of the drum and secured to the threaded member, the axis of the shaft being parallel to but offset from the axis of the threaded member, means threadedly engaging the threaded member and positioned in fixed relation to the tape guiding means whereby rotation of the threaded member in relation to the engaging means shifts the drum in relation to the tape both toward and away from the tape and transverse to the direction of tape movement, a magnetic head having pole-tips for engaging the tape, means supporting the head in position for the pole tips to press the tape into the groove in the drum when said drum supporting shaft is positioned by the threaded member in closest proximity to the magnetic head, and means coupled to the threaded member for moving the head supporting means in a direction parallel to the axis of the threaded member simultaneously with the transverse movement of the drum to maintain the pole tips in alignment with the groove.

7. Apparatus as defined in claim 6 wherein the last named means includes a disc secured to the threaded member, the disc engaging a slot in the head supporting means.

8. Apparatus as defined in claim 6 further including means for indexing the threaded member through one revolution at a time to shift the head and drum relative to the tape.

References Cited

UNITED STATES PATENTS

| | | | |
|---|---|---|---|
| 3,069,510 | 12/1962 | Noble | 274—43 |
| 2,668,059 | 2/1954 | Roberts | 274—4 |

LEONARD FOREMAN, *Primary Examiner.*

R. A. FIELDS, *Assistant Examiner.*